(12) United States Patent
Habecker et al.

(10) Patent No.: US 6,702,869 B2
(45) Date of Patent: *Mar. 9, 2004

(54) HIGH CAPACITANCE NIOBIUM POWDERS AND ELECTROLYTIC CAPACITOR ANODES

(75) Inventors: Kurt A. Habecker, Douglassville, PA (US); James A. Fife, Myrtle Beach, SC (US)

(73) Assignee: Cabot Corporation, Boston, MA (US)

( * ) Notice: Subject to any disclaimer, the term of this patent is extended or adjusted under 35 U.S.C. 154(b) by 34 days.

This patent is subject to a terminal disclaimer.

(21) Appl. No.: 10/061,497

(22) Filed: Feb. 1, 2002

(65) Prior Publication Data

US 2002/0124687 A1 Sep. 12, 2002

Related U.S. Application Data

(63) Continuation of application No. 09/310,322, filed on May 12, 1999, now Pat. No. 6,375,704.

(51) Int. Cl.⁷ .......................... C22C 29/16; C22C 27/00
(52) U.S. Cl. .............................. 75/229; 75/244; 75/255
(58) Field of Search ........................... 75/229, 255, 244

(56) References Cited

U.S. PATENT DOCUMENTS

| 3,630,718 A | 12/1971 | Neuenschwander ........... 75/0.5 |
| 3,635,693 A | 1/1972 | Friedrich et al. ......... 75/0.5 BB |
| 3,647,420 A | 3/1972 | Restelli ........... 75/84 |
| 4,009,007 A | 2/1977 | Fry ........... 29/182.5 |
| 4,017,302 A | 4/1977 | Bates et al. |

(List continued on next page.)

FOREIGN PATENT DOCUMENTS

| CA | 2285786 | 4/2000 | ........... C22B/34/24 |
| CN | 87 1 07675 A | 5/1988 | |
| CN | 1079333 A | 12/1993 | |
| DE | 198 31 280 A1 | 1/2000 | ........... C22B/5/12 |
| EP | 0 953 847 A1 | 11/1999 | ........... G01R/31/26 |
| EP | 0 984 469 A2 | 3/2000 | ........... H01G/9/042 |
| EP | 0 984 470 A2 | 3/2000 | ........... H01G/9/15 |
| EP | 0 997 542 A1 | 5/2000 | ........... C22B/34/24 |
| GB | 1123015 | 8/1965 | |
| GB | 1 549 702 A | 8/1979 | |
| JP | 80027601 B | 7/1980 | |
| JP | 58154221 A | 9/1983 | |
| RU | 1057995 A | 11/1983 | |
| RU | 1556420 A3 | 2/1994 | |
| WO | WO 98/19811 | 5/1998 | |
| WO | WO 00/08662 A1 | 2/2000 | ........... H01G/9/042 |
| WO | WO 00/36617 A1 | 6/2000 | ........... H01G/9/04 |

OTHER PUBLICATIONS

Peabody, "Investigation of Columbium as an Electrolytic Capacitor Anode, Part II," *U.S. Army Signal Research and Development Laboratory, DK Task Nr. 3A99–15–003–04*, pp. 1–11 (No date available).

Palatnik, "Heat Field Stability and Crystallization Peculiarities of Amorphous $Nb_2O_5$, Films" *Fizika I Khimiya Obrabotki Materialov*, 5:87–94 (Feb. 7, 1980).

Eckert, "Niobium Compounds and Alloys," *Int. J. Refractory Metals and Hard Materials*, 12:335–340 (1993–1994).

Bord et al., "Quality of Niobium Oxide Semiconductor Capacitors as a Function of Chemical Composition of the Niobium Powder," No. 1(46):11–15 (1982).

(List continued on next page.)

*Primary Examiner*—Daniel J. Jenkins

(57) ABSTRACT

A niobium powder is described which when formed into an electrolytic capacitor anode, the anode has the capacitance of at least 62,000 CV/g. Methods of making flaked niobium powder which have high capacitance capability when formed into electrolytic capacitor anodes is also described. Besides niobium, the present invention is also applicable to other metals, including valve metals.

79 Claims, 1 Drawing Sheet

U.S. PATENT DOCUMENTS

| | | | |
|---|---|---|---|
| 4,084,965 A | 4/1978 | Fry | 75/230 |
| 4,141,720 A | 2/1979 | Vartanian | 75/0.5 BB |
| 4,149,876 A | 4/1979 | Rerat | 75/0.5 |
| 4,231,790 A | 11/1980 | Hähn et al. | 75/0.5 BB |
| 4,347,084 A | 8/1982 | Hähn et al. | 75/245 |
| 4,356,028 A | 10/1982 | Bates | 75/0.5 |
| 4,441,927 A | 4/1984 | Getz et al. | 75/229 |
| 4,483,819 A | 11/1984 | Albrecht et al. | 419/2 |
| 4,512,805 A | 4/1985 | Albrecht et al. | 75/244 |
| 4,537,641 A | 8/1985 | Albrecht et al. | 148/11.5 |
| 4,544,403 A | 10/1985 | Schiele et al. | 75/0.5 |
| 4,548,672 A | 10/1985 | Albrecht et al. | 156/646 |
| 4,555,268 A | 11/1985 | Getz | 75/229 |
| 4,569,693 A | 2/1986 | Albrecht et al. | 75/252 |
| 4,684,399 A | 8/1987 | Bergman et al. | 75/0.5 BB |
| 4,722,756 A | 2/1988 | Hard | 148/126 |
| 4,740,238 A | 4/1988 | Schiele | 75/0.5 BB |
| 4,940,490 A | 7/1990 | Fife et al. | 75/229 |
| 4,954,169 A | 9/1990 | Behrens | 75/228 |
| 5,211,741 A | 5/1993 | Fife | 7/255 |
| 5,234,491 A | 8/1993 | Chang | 75/622 |
| 5,242,481 A | 9/1993 | Kumar | 75/364 |
| 5,245,514 A | 9/1993 | Fife et al. | 361/529 |
| 5,261,942 A | 11/1993 | Fife et al. | 75/342 |
| 5,284,531 A | 2/1994 | Fife | 148/513 |
| 5,412,533 A | 5/1995 | Murayama et al. | 361/528 |
| 5,448,447 A | 9/1995 | Chang | 361/529 |
| 5,580,367 A | 12/1996 | Fife | 75/255 |
| 6,051,044 A | 4/2000 | Fife | |
| 6,165,623 A | 12/2000 | Fife | 428/472 |
| 6,375,704 B1 * | 4/2002 | Habecker et al. | 75/229 |

OTHER PUBLICATIONS

Schwartz et al., "Niobium Solid Electrolytic Capacitors," *J. Electrochemical Society*, 108(8):750–757 (1961).

Jackson et al., "The Use of Niobium as an Anode Material in Liquid Filled Electrolytic Capacitors," *Electrocomponent Science and Technology*, 1:27–37 (1974).

*J. Electrochemical Society: Reviews and News*, 24(12):408C–409C (Dec. 1977).

Orlov et al., "Study of Oxygen Solubility in Niobium," *Izvestiya Akademii Nauk SSSR. Metally*, 5:202–205 (1985).

Krehl et al., "The Influence of Gas Atmospheres on the First–Stage Sintering of High–Purity Niobium Powders," *Metallurgical Transactions A*, 15A:1111–1116 (Jun. 1984).

Mifune et al., "Niobium Solid Electrolytic Capacitors," *National Technical Report 9:147* (*1963*).

Levinsky et al., "Change in Porous Structure and Leakage Currents of Niobium Capacitor Anodes During Electrolytic Oxidation," *Poroshkovaya Metallurgiya*, 3:56–59 (1991).

Patent Abstracts of Japan, vol. 13, No. 312 (E–788). Jul. 17, 19879 & JP 01 084656A, Mar. 29, 1989 (see Abstract).

Patent Abstracts of Japan, vol. 6, No. 109 (M–137), Jun. 19, 1982 & JP 57 039043A, Mar. 4, 1982 (See Abstract).

International Search Report for International Application PCT/US97/19949 published May 14, 1998.

* cited by examiner

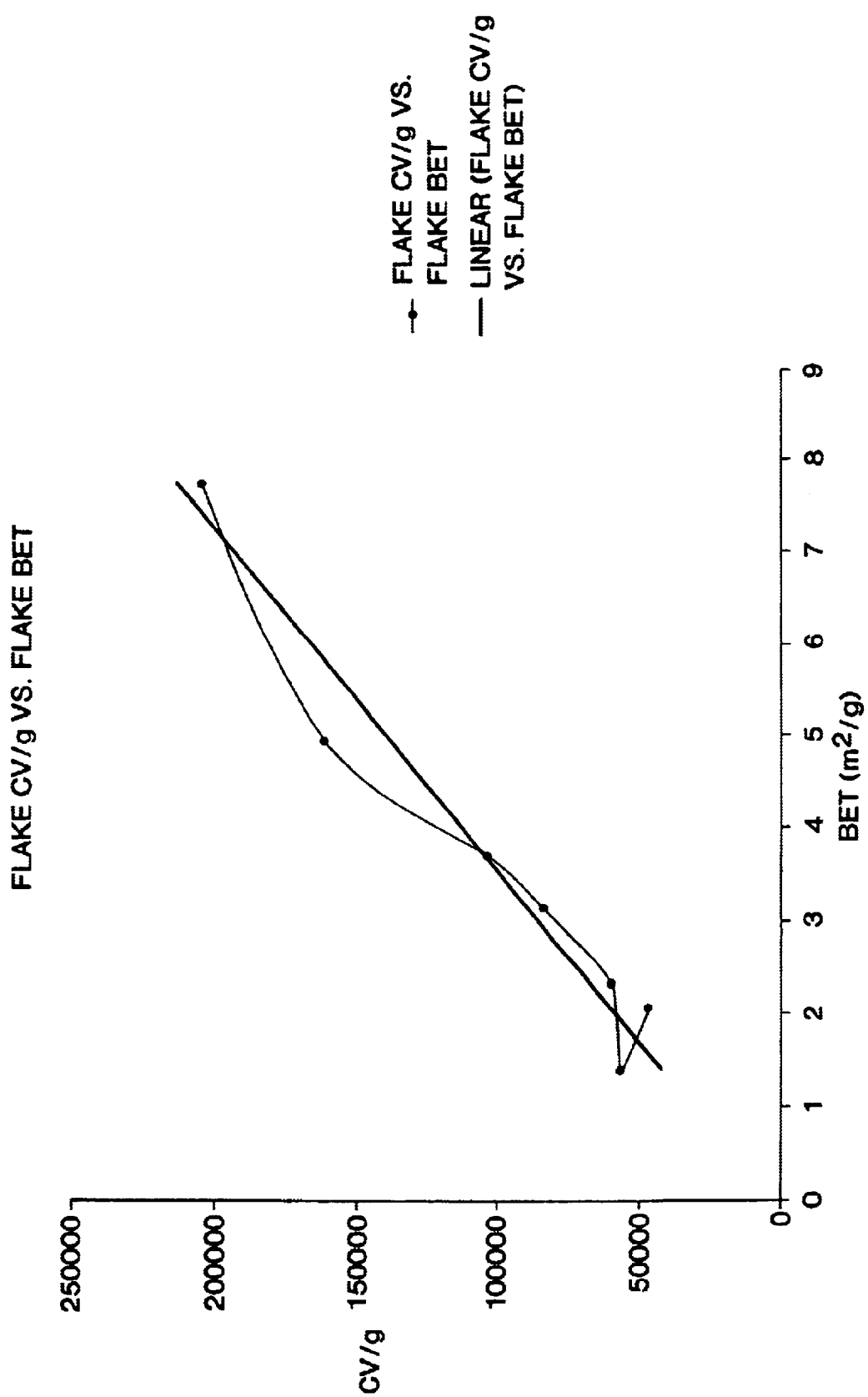

HIGH CAPACITANCE NIOBIUM POWDERS AND ELECTROLYTIC CAPACITOR ANODES

This application is a continuation of U.S. patent application Ser. No. 09/310,322, filed May 12, 1999, now U.S. Pat. No. 6,375,704.

BACKGROUND OF THE INVENTION

The present invention relates to niobium powders and electrolytic capacitors using the niobium powders as well as methods of making the powders and electrolytic capacitors.

For many years, it has been the goal of various researchers to develop niobium electrolytic capacitors because of the high di-electric constant of its oxide and the relatively low cost of niobium compared to a variety of other metals. Initially, researchers in this field considered the possibility of using niobium as a substitute for tantalum capacitors. Accordingly, many studies were conducted to determine the suitability of replacing tantalum with niobium.

In some of these studies, however, it was concluded that niobium has serious fundamental deficiencies that needed to be resolved, thus inferring that niobium was not an acceptable substitute for tantalum. (See J. Electrochem. Soc. p. 408 C, December 1977). In another study, one conclusion reached was that the use of niobium in solid electrolytic capacitors seems very unlikely due to various physical and mechanical problems, such as field crystallization. (Electrocomponent Science and Technology, Vol. 1, pp. 27–37 (1974)). Further, in another study, the researchers concluded that anodically formed passive films on niobium were different from electrical properties accomplished with tantalum and that the use of niobium led to complexities which were not present with tantalum. (See Elecrochimica Act., Vol. 40, no. 16, pp. 2623–26 (1995)). Thus, while there was initial hope that niobium might be a suitable replacement for tantalum, the evidence showed that niobium was not capable of replacing tantalum in the electrolytic capacitor market.

Besides tantalum electrolytic capacitors, there is a market for aluminum electrolytic capacitors. However, the aluminum electrolytic capacitors have dramatically different performance characteristics from tantalum electrolytic capacitors.

A driving force in electronic circuitry today is the increasing move toward lower Equivalent Series Resistance (ESR) and Equivalent Series Inductance (ESL). As IC performance increases with submicron geometry, there is a need for lower power supply voltage and noise margin. At the same time, increasing IC speeds require higher power needs. These conflicting requirements create a demand for better power management. This is being accomplished through distributed power supplies which need larger currents for decoupling noise. Increasing IC speeds also mean lower switching times and higher current transients. The electrical circuit must, therefore, also be designed to reduce the transient load response. This broad range of requirements can be met if the circuit has large enough capacitance but low ESR and ESL.

Aluminum capacitors typically provide the largest capacitance of all capacitor types. ESR decreases with increase in capacitance. Therefore, currently a large bank of high capacitance aluminum capacitors are used to meet the above requirements. However, aluminum capacitors do not really satisfy the designers' requirements of low ESR and ESL. Their mechanical construction with liquid electrolyte inherently produce ESR in the 100s of milliohm along with high impedance.

SUMMARY OF THE INVENTION

A feature of the present invention is to provide niobium powders having high capacitance capability.

A further feature of the present invention is to provide niobium powders, preferably having high surface areas and physical characteristics which permit the niobium powders to be formed into a capacitor having high capacitance.

Another feature of the present invention is to provide niobium powders which, when formed into capacitors, have a low DC leakage.

Additional features and advantages of the present invention will be set forth in part in the description which follows, and in part will be apparent from the description, or may be learned by practice of the present invention.

The present invention relates to a niobium powder. Another aspect of the present invention relates to any niobium powder having a BET surface area of at least about 5.1 m$^2$/g.

The present invention also relates to a niobium powder, which when formed into an electrolytic capacitor anode, the anode has a capacitance of above 62,000 CV/g.

Also, the present invention relates to a method to making flaked niobium powder which comprises the step of milling niobium powder and then subjecting the milled niobium powder to deoxidized treatments and then continuing milling of the niobium powder.

It is to be understood that both the foregoing general description and the following detailed description are exemplary and explanatory only and are intended to provide further explanation of the present invention, as claimed.

BRIEF DESCRIPTION OF THE DRAWINGS

The FIGURE is a graph showing the BET surface areas of niobium powders and their respective capacitance when formed into anodes and sintered at a temperature of 1150 or 1300° C.

DETAILED DESCRIPTION OF THE PRESENT INVENTION

The present invention relates to niobium powders having high capacitance capability.

The niobium that can be used is any niobium powder, such as flaked, angular, nodular, and mixtures or variations thereof. The niobium powders (e.g. flaked, angular, nodular, and mixtures thereof) preferably have a BET surface area of at least 5.1 m$^2$/g or preferably at least 5.5 m$^2$/g, and more preferably, at least about 6.0 m$^2$/g, and even more preferably from about 6.0 to about 15.0 m$^2$/g, and most preferably from about 8.0 to about 15.0 m$^2$/g,. The BET ranges are based on pre-agglomerated niobium powders. The niobium powder can be hydrided or non-hydrided. Also, the niobium powder can be agglomerated.

With respect to the flaked niobium powder, the flaked niobium powder can be characterized as flat, plate shaped, and/or platelet. Also, the flaked niobium powder can have an aspect ratio (ratio of diameter to thickness) of from about 3 to about 300and preferably, from about 200 to about 300. The flaked niobium powder permits enhanced surface area due to its morphology. Preferably, the BET surface area of the flaked niobium powder is at least 5.5 m$^2$/g, and more preferably, is at least about 6.0 m$^2$/g and even more preferably, is at least about 7.0 m$^2$/g. Preferred ranges of BET surface area for the flaked niobium powder are from about 6.0 m$^2$/g to about 15.0 m$^2$/g and more preferably from about 8.0 m$^2$/g to about 12.0 m$^2$/g or from about 9.0 m$^2$/g to about 11.0 m$^2$/g. The BET ranges are based on pre-agglomerated flaked niobium powders.

The flaked niobium powder can be agglomerated. The flaked niobium powder can also be hydrided or non-hydrided. The agglomerated flaked niobium powder preferably has a Scott Density of less than about 35 g/in$^3$, and more preferably about 10 to about 35 g/in$^3$. The unagglomerated flaked niobium powder preferably has a Scott Density of less than about 12, and more preferably, less than about 5 g/in$^3$. Preferably, the agglomerated flaked niobium powder has a flow of greater than 80 mg/s, more preferably from about 80 mg/s to about 500 mg/s.

In general, the flaked niobium powder can be prepared by taking a niobium ingot and making the ingot brittle by subjecting it to hydrogen gas for hydriding. The hydrided ingot can then be crushed into an angular powder, for instance, with the use of a jaw crusher and impact milled one or more times. The angular powder can then be cleaned with the use of an acid leach or the like. The hydrogen can then be removed by heating in a vacuum and the degassed angular powder can then be subjected to milling, such as with use of a stirred ball mill where the powder is dispersed in a fluid medium (aqueous or non-aqueous) such as ethanol and the medium may include a lubricating agent such as stearic acid or the like, to form the flaked powder by the impact of the stainless steel balls moved by the action of rotating bars. Various sizes of flakes can be made by hydrogen embrittlement followed by subjecting the flakes to impact milling, for example with use of a fluidized bed jet mill, Vortec milling, or other suitable milling steps.

In more detail, a niobium ingot is hydrided by heating in a vacuum to form an embrittled ingot which is crushed into a powder. The hydrogen in the powders can optionally be removed by heating the particle in a vacuum. The various BET surface areas can be achieved by subjecting the powder to milling, preferably an attritor milling process. The higher the BET surface area of the powder generally will require a longer milling time. For instance, with a milling time of approximately 60 minutes a BET surface area of approximately 1.0 m$^2$/g can be achieved. To obtain even higher BET surface areas, longer milling times will be needed and to achieve the BET surface area of from about 4 to about 5 m$^2$/g or greater, milling times on the order of approximately 24 hours or more in an attritor mill is one way of making such niobium powders having high BET surface area ranges. When making such high surface areas, it is preferred to use a 30-S Szegvari attritor mill using 1,000 lbs. 3/16" SS media, and approximately 40 pounds of niobium powder with the mill set at a rotation of approximately 130 rpm. Also, the mill will contain a sufficient amount of a medium such as ethanol on the order of 13 or more gallons. After milling, the niobium powders are then subjected to a heat treatment and preferably the niobium powders can have a phosphorus content to help in minimizing the reduction in surface area during the heat treatment. The heat treatment can be any temperature sufficient to generally cause agglomeration and preferably without reducing the surface area. A temperature for heat treatment which can be used is approximately 1100° C. for 30 minutes. However the temperature and time can be modified to ensure that the high BET surface area is not reduced.

Preferably, in such a milling process, intermittently the niobium powder, which is being milled, is subjected to a deoxidation. Any deoxidation method can be used, such as magnesium deoxidation. Preferably, a high temperature magnesium deoxidation is used. Other deoxidation methods that can be used include, but are not limited to, getter composites like getter methods, such as those recited in U.S. Pat. No. 4,960,471 incorporated in its entirety by reference herein. After such a step, the niobium powder can then be acid leached to remove any residual magnesium, if this type of deoxidation method is used. Afterwards, the niobium powder can then be subjected to further milling, such as attritor milling. These additional steps which can be used any number of times is preferably used for purposes of making niobium flaked powders having a high capacitance capability. The deoxidation with or without an acid leaching has the ability to reduce, if not eliminate, the shattering or breaking of the flaked particles thus permitting a higher surface area and also a higher capacitance capability for the niobium flaked powders when formed into capacitor anodes.

The deoxidation step(s), like high temperature magnesium deoxidation, preferably makes the niobium powder more ductile or returns the niobium powder to a more ductile state for further milling. Without wishing to be bound by any theory, it is believed that the deoxidation step has the ability to remove interstitial oxides from the niobium powder and relieves the stress on the flaked particles. Since interstitial oxygen increases as a function of milling time and, at saturation levels for a given flaked surface, can result in the shattering or breaking of a flake particle, the deoxidation step overcomes these problems to permit the formation of a niobium flaked powder which has higher capacitance capability. Preferably, the first deoxidation step occurs when the niobium flaked powder reaches a BET surface area of approximately 1.5 m$^2$/g during the milling process and can occur at intermittent steps thereafter such as when the niobium flaked powder reaches a BET surface area of approximately 4.5 m$^2$/g and then when the niobium flaked powder reaches a BET surface area of about 10.0 m$^2$/g and so on. The deoxidation step can be used any number of times and it is preferred to use the deoxidation step before the work hardening barriers described above are encountered. Preferably, if a magnesium deoxidation is used, from about 4% to about 6% magnesium by total weight of niobium is used during the magnesium deoxidation step and the temperature at which this magnesium deoxidation step occurs is preferably at a temperature of from about 700 to about 1600° C., and more preferably from about 750 to about 950° C., and most preferably from about 750 to about 800° C. The magnesium deoxidation preferable is accomplished in an inert atmosphere, like argon. Also, the magnesium deoxidation is generally for a sufficient time and at a sufficient temperature to remove at least a significant portion of the oxygen in the flaked niobium powder. More preferably, the length of time for the magnesium deoxidation is from about 20 minutes to about 3 hours, and more preferably from about 45 minutes to about 60 minutes. The magnesium that is used generally, vaporizes, and precipitates out, e.g. as MgO$_2$, for instance, on the cold wall of the furnace in this magnesium deoxidation step. Any remaining magnesium is the preferably substantially removed by any process such as acid leaching with a dilute nitric acid and hydrofluoric acid solution.

The niobium powder can optionally have a oxygen content. The amount of oxygen content can be about 2,000 ppm or below or above. The niobium powder for instance can have has an oxygen content of from about 2,000 ppm to about 60,000 ppm. Alternatively, the niobium or any other type of niobium can have a low oxygen content, such as less than 1,000 ppm.

Further, the niobium powder can also have a phosphorus content, such as by doping with phosphorus alone or with oxygen. The doping of the niobium powder with phosphorus is also optional. In one embodiment of the present invention, the amount of phosphorus doping of the niobium powder is less than about 400 ppm and more preferably less than about 100 ppm, and most preferably less than about 25 ppm. Other conventional additives, including dopant, can be included.

The various niobium powders described above can be further characterized by the electrical properties resulting from the formation of a capacitor using the niobium powders of the present invention. In general, the niobium powders of the present invention can be tested for electrical properties by pressing the niobium powder into an anode and sintering the pressed niobium powder at appropriate temperatures and then anodizing the anode to produce an electrolytic capacitor anode which can then be subsequently tested for electrical properties.

Accordingly, another embodiment of the present invention relates to capacitors formed from the nitrogen containing niobium powders of the present invention. Anodes made from some of the niobium powders of the present invention can have a capacitance of greater than about 62,000 CV/g.

Accordingly, the present invention further relates to niobium powder which when formed into an electrolytic capacitor anode, the anode has a capacitance of above 62,000 CV/g and more preferably above 70,000 CV/g. Preferably, the niobium powder when formed into an electrolytic capacitor anode, the anode has a capacitance of from about 65,000 CV/g to about 150,000 CV/g and more preferably from about 65,000 CV/g to about 175,000 CV/g and most preferably from about 65,000 CV/g to about 250,000 CV/g. These capacitance are measured in the following manner and when the niobium powder is formed into an anode in the following way:

A tantalum can is used to produce an anode. The tantalum can measure (0.201 inches in diameter×0.446 inches in length) and is open at one end and has a tantalum wire welded to the outside. The tantalum can is free-filled with low Scott density niobium flake powder, weighed and sintered. Sintering temperatures may range from 100° C. to 1500° C. and preferably from 1100° C. to 1300° C. The sintered niobium filled tantalum can is then anodized using a formation voltage of 10Vf to 50Vf and preferably 20Vf to 35Vf. The anodized and sintered niobium filled tantalum can is then tested for capacitance ($\mu$F). The capacitance($\mu$F) of an empty tantalum can is subtracted from the capacitance of the niobium filled tantalum can to yield a true capacitance ($\mu$F) reading. The resultant electrical analysis is reported in $\mu$FV/g.

In forming the capacitor anodes of the present invention, a sintering temperature is used which will permit the formation of a capacitor anode having the desired properties. Preferably, the sintering temperature is from about 1100° C. to about 1750° C., and more preferably from about 1100° C. to about 1400° C., and most preferably from about 1150° C. to about 1300° C.

The anodes formed from the niobium powders of the present invention are preferably formed at a voltage of less than about 60 volts, and preferably from about 30 to about 50 volts and more preferably at about 40 volts. Lower forming voltages are also possible, such as about 30 volts or less. Preferably, the working voltages of anodes formed from the niobium powders of the present invention are from about 4 to about 16 volts and more preferably from about 4 to about 10 volts. Also, the anodes formed from the niobium powders of the present invention preferably have a DC leakage of less than about 5.0 na/CV. In an embodiment of the present invention, the anodes formed from some of the niobium powders of the present invention have a DC leakage of from about 5.0 na/CV to about 0.50 na/CV.

With the high capacitance niobium powder, higher forming voltages and higher working voltages can be used such as from about 50 to about 80 volts formation and from about 10 to about 20 working voltage. Also, an additional benefit of the present invention is the improvement in DC leakage, i.e., stable or lower DC leakage as the BET of the niobium increase.

The present invention also relates to a capacitor in accordance with the present invention having a niobium oxide film on the surface thereof. Preferably, the niobium oxide film comprises a niobium pentoxide film.

Besides niobium, the present invention's method of flaking is applicable to any metal which can be formed into a flake, such as valve metals including tantalum. The resulting benefits such as higher BETs, higher capacitance of the anode formed from the flaked metal and/or the related forming voltage, working voltage, and improved or stable DC leakage are also considered part of the present invention.

The capacitors of the present invention can be used in a variety of end uses such as automotive electronics; cellular phones; computers, such as monitors, mother boards, and the like; consumer electronics including TVs and CRTs; printers/copiers; power supplies; modems; computer notebooks; and disk drives.

The present invention will be further clarified by the following examples, which are intended to be exemplary of the invention.

Test Methods
Capacitance Method A: Flake CV/g Electrical Measurements

[1] Anode Preparation
  (a) Prepare N=1 per sample of powder into a fabricated Ta can
    (1) Record the weight of each can before loading with powder
    (2) Fill the can full with powder using no force to compact the powder
    (3) Record the weight of the loaded can.
[2] Anode Sintering
  (a) 1300 Deg C.×10 minute (profile "A")
  (b) Load N=1 per sample and 1 empty can per sinter in a large tray in such a manner that individual identification can be maintained.
[3] 35V Ef Evaluation
  (a) 35V Ef@60 Deg C./0.1% H3PO4 Electrolyte 2V/5 minutes or 20 mA/g constant current
[4] DC Leakage/Capacitance-ESR Testing
  (a) DC Leakage Testing
    70% Ef (24.5 VDC) Test Voltage
    60 second charge time
    10% H3PO4@21 Deg C.
  (b) Capacitance-DF Testing:
    18% H2SO4@21 Deg C.
    120 Hz Capacitance Method B: Flake Powder CV/g Electrical Measurements

[1] Anode Fabrication
  (a) 2.5 and 3.0 Dp (b) non-lubed powder using the Nb 0.025" "expanded leads"
(c) size=0.197" dia 0.230" length;
(d) powder wt=340 mg

[2] Anode Sintering (10'/A Ramp)
   (a) 1100 Deg C.*10'
       1200 Deg C.*10'
       1300 Deg C.*10'

[3] 35V Ef Anodization
   (a) 35V Ef@60 Deg C./0.1% H3PO4 Electrolyte 50 mA/g constant current

[4] DC Leakage/Capacitance-ESR Testing
   (a) DC Leakage Testing
       70% Ef (24.5 VDC) Test Voltage
       60 second charge time
       10% H3PO4@21 Deg C.
   (b) Capacitance-DF Testing:
       18% H2SO4@21 Deg C.
       120 Hz

[b 5] 50V Ef Anodization
   (a) 50V Ef@60 Deg C./0.1% H3PO4 Electrolyte 50 mA/g constant current

[6] DC Leakage/Capacitance-ESR Testing
   (a) DC Leakage Testing
       70% Ef (35 VDC) Test Voltage
       60 second charge time
       10% H3PO4@21 Deg C.
   (b) Capacitance-DF Testing:
       18% H2SO4@21 Deg C.
       120 Hz Scott Density, oxygen analysis, phosphorus analysis, and BET analysis were determined according to the procedures set forth in U.S. Pat. Nos. 5,011,742; 4,960,471; and 4,964,906, all incorporated hereby in their entireties by reference herein.

EXAMPLES 1–10

Electron beam produced niobium ingot was hydrided by heating the ingot in a vacuum of $10^{-4}$ torr to 1050° C. holding at 1050° C. for 15 minutes, and then cooling the ingot under vacuum to 600° C. Once the ingot reached 600° C., particle pressure hydrogen was lowered into the furnace chamber at 200 scfh and ingot was cooled under partial pressure hydrogen flow over a period of 48 hours. The vacuum was then pumped down to −28" mercury and then backfilled with argon to −5" Hg. The pressure was maintained until the temperature, as measured by a work thermocouple, stabilized. Air was gradually introduced in increasing pressure such that the work temperature did not rise. The embrittled ingot was crushed into angular powder in a jaw crusher and impact milled and then classified to 5 by 80 microns in an air classifier. Hydrogen was removed from the size-reduced hydrogen-containing particles by heating the particles to 7000 C. in a vacuum until pressure was no longer affected by hydrogen being emitted from the particles.

The degassed angular powder was then processed in a 30-S Szegvari attritor stirred ball mill (130 rpm for about 6 hours) where powder dispersed in 15 gal. ethanol medium and 1000 lbs. 3/16" 440C. stainless steel medium was formed into flaked powder by the impact of stainless steel balls moved by the action of rotating bars. After this initial milling, the flaked niobium powder upon measurement had a surface area of about 1.5 $m^2/g$. The flaked niobium powder was them magnesium deoxidized using about 4 to about 6% magnesium by weight of niobium. The magnesium deoxidation occurred at a temperature of about 800° C. and for about 60 minutes. The flaked niobium powder was then removed and acid leached to remove any residual magnesium. This acid leaching was accomplished by creating a slurry containing 40 lbs. of niobium flaked, 400 g/lb. of deionized ice, 200 ml/lb. nitric acid and 2 ml/lb. hydrofluoric acid and straining and rinsing to a conductivity of 50 $\mu$hos. The flaked niobium powder was then reintroduced into a 1-S Szegvari attritor stirred ball mill and further milled in accordance with the parameter set forth in Table 1 for each of the examples. In each of the examples, the average ethanol slurry temperature during the milling was approximately 85° F. and the milling speed was approximately 350 rpm. The variables for each of the examples are set forth in Table 1 as well as the results. In each of the examples set forth in the Table, 0.5 pounds of deoxidized flaked niobium powder was balled milled using 40 pounds of 3/16"440C stainless steel media in 2/3 gallon of ethanol and optionally with stearic acid in an amount of about 1% wt (2.5g).

| Sample No. | Mill time (hrs) | BET (m2/g) | Ds (g/cc) Sinter density | Sinter temp. | Vf | CV/g (flaked) | CV/g @ 2.5 Dp (Press Density) | Milling Time (hr.) |
|---|---|---|---|---|---|---|---|---|
| 1 | 0.5 | 2.08 | | 1300° C. | 35 | 46,718 | | 0.5 |
| 2 | 0.75 | 1.39 | | 1300° C. | 35 | 56,186 | | 0.75 |
| 3 | 1 | 2.3217 | | 1300° C. | 35 | 59,768 | | 1.0 |
| 4 | 2 | 3.14 | | 1300° C. | 35 | 83,415 | | 2.0 |
| 5 | 3 | 3.7 | 0.04843 | 1300° C. | 35 | 102,513 | 73,021 | 3.0 |
| 6 | 5 | 10.38 | | 1300° C. | 35 | 129,864 | | 5.0 |
| 7 | 5 | 4.9177 | 0.04442 | 1300° C. | 35 | 120,704 | 85,938 | 5.0[a] |
| 8 | 8 | 7.69 | 0.056024 | 1300° C. | 35 | 123,861 | 88,306 | 8.0[a] |
| 9 | 5 | 4.9177 | 0.052193 | 1150° C. | 20 | 160,916 | 114,672 | 5.0[a] |
| 10 | 8 | 7.69 | 0.046441 | 1150° C. | 20 | 204,498 | 145,632 | 8.0[a] |

[a]EtOH w/stearic acid

After the desired deformation into flake, the niobium powder was then removed and washed to remove any alcohol present. The niobium powder was then washed with a mixture of deionized water, hydrofluoric acid, nitric acid, and hydrochloric acid in an amount of 750 ml/lb deionized water, 10 ml/lb. hydrofluoric acid, 350/750 ml/lb. nitric acid, and 750 ml/lb. hydrochloric acid, all based on per pound niobium to remove carbon and metal contamination (e.g. iron, nickel, chromium and the like transferred from contact with stainless steel balls). The acid concentrations were about 30% HCl, about 68–70% $HNO_3$ and about 48–51%

HF. Afterwards, the niobium powder as again washed with deionized water and then dried. The acid washed flaked powder was dried in air at 150° F. (65° C.).

The various lots of niobium powder were then pressed into an anode mold 5 mm in diameter around a 0.6 mm diameter niobium lead wire to a density of 3.5 g/cc. Samples of the pressed niobium powder were sintered in a vacuum (at less than $10^{-3}$ Pa) at the temperatures indicated in Table 1 for 10 minutes, then anodized by applying 20 mA/g constant current at the forming voltage indicated in Table 1 to the anode immersed in 0.1 weight percent phosphoric acid to produce electrolytic capacitor anodes, which were washed and dried. The capacitor performance characteristics, evaluated by measurements on the anodes immersed in 18 wt. % sulfuric acid, are reported in Table 1. Capacitance, determined at a frequency of 120 Hertz, is reported in units of microfarad volts per gram (CV/g) and microfarad volts per cubit centimeter of anode volume (CV/cc); DC leakage, measured after a 1 minute charge of 35 volts, is reported in units of nanoamperes per microfarad-volt (nA/CV).

As can be seen in Table 1 above, and in the Figure, which sets forth the capacitance and BET of the various examples made, the capacitance of the anodes formed from the niobium powders were greatly increased using the process of the present invention which permitted longer milling times without fracturing the flaked niobium powder. As can be seen in Table 1, when a forming voltage of 20 volts was used to form the anode from the flaked niobium powder that was sintered at 1150° C. The capacitance was 204,498 CV/g. In addition, the benefits of using alcohol and preferably ethanol with lubricating agents, like stearic acid was also observed.

Other embodiments of the present invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A capacitor anode comprising niobium powder, wherein said anode has a capacitance of at least 65,000 CV/g, and said anode is formed at a voltage of less than about 60 volts.

2. The capacitor anode of claim 1, wherein said anode has a capacitance of from 65,000 to about 250,000 CV/g.

3. The capacitor anode of claim 1, wherein said anode has a capacitance of from about 75,000 to about 250,000 CV/g.

4. The capacitor anode of claim 1, wherein said anode has a capacitance of from about 100,000 to about 250,000 CV/g.

5. The capacitor anode of claim 1, wherein said anode has a capacitance of from about 125,000 to about 250,000 CV/g.

6. The capacitor anode of claim 1, wherein said anode has a capacitance of from about 100,000 to about 210,000 CV/g.

7. The capacitor anode of claim 1, wherein said anode is formed at a voltage of from about 30 to about 50 volts.

8. The capacitor anode of claim 1, wherein said niobium powder comprises flaked niobium powder.

9. A capacitor anode comprising niobium powder having a BET surface area of at least about 5.5 $m^2/g$, wherein said anode is formed at a voltage of less than about 60 volts.

10. The capacitor anode of claim 9, wherein said niobium powder has a BET surface area of at least about 7.0 $m^2/g$.

11. The capacitor anode of claim 9, wherein said niobium powder has a BET surface area of at least about 10 $m^2/g$.

12. The capacitor anode of claim 9, wherein said niobium powder has a BET surface area of from 6.0 $m^2/g$ to about 12 $m^2/g$.

13. The capacitor anode of claim 1, wherein said niobium powder is sintered at a temperature of from about 1200° C. to about 1750° C.

14. The capacitor anode of claim 1 having a phosphorus level of less than about 400 ppm.

15. The capacitor anode of claim 1, wherein said niobium powder is nitrogen doped.

16. The capacitor anode of claim 1, wherein said niobium powder has at least about 100 ppm of nitrogen present.

17. The capacitor anode of claim 1, wherein said niobium powder has nitrogen present in an amount of from about 100 ppm to about 5,000 ppm.

18. The capacitor anode of claim 2, wherein said niobium powder is nitrogen doped.

19. The capacitor anode of claim 3, wherein said niobium powder is nitrogen doped.

20. The capacitor anode of claim 4, wherein said niobium powder is nitrogen doped.

21. The capacitor anode of claim 5, wherein said niobium powder is nitrogen doped.

22. The capacitor anode of claim 6, wherein said niobium powder is nitrogen doped.

23. The capacitor anode of claim 7, wherein said niobium powder is nitrogen doped.

24. The capacitor anode of claim 8, wherein said niobium powder is nitrogen doped.

25. The capacitor anode of claim 9, wherein said niobium powder is nitrogen doped.

26. The capacitor anode of claim 10, wherein said niobium powder is nitrogen doped.

27. The capacitor anode of claim 2, wherein said niobium powder has at least about 100 ppm of nitrogen present.

28. The capacitor anode of claim 3, wherein said niobium powder has at least about 100 ppm of nitrogen present.

29. The capacitor anode of claim 4, wherein said niobium powder has at least about 100 ppm of nitrogen present.

30. The capacitor anode of claim 5, wherein said niobium powder has at least about 100 ppm of nitrogen present.

31. The capacitor anode of claim 6, wherein said niobium powder has at least about 100 ppm of nitrogen present.

32. The capacitor anode of claim 7, wherein said niobium powder has at least about 100 ppm of nitrogen present.

33. The capacitor anode of claim 8, wherein said niobium powder has at least about 100 ppm of nitrogen present.

34. The capacitor anode of claim 9, wherein said niobium powder has at least about 100 ppm of nitrogen present.

35. The capacitor anode of claim 10, wherein said niobium powder has at least about 100 ppm of nitrogen present.

36. The capacitor anode of claim 1, wherein said niobium powder has a flow of at least about 80 mg/s.

37. The capacitor anode of claim 1, wherein said niobium powder has a flow of from about 80 to about 500 mg/s.

38. The capacitor anode of claim 1, wherein said niobium powder has a Scott Density of about 35 $g/in^3$ or less.

39. The capacitor anode of claim 1, wherein said niobium powder has a Scott Density of from about 10 to about 35 $g/in^3$.

40. The capacitor anode of claim 1, wherein said niobium powder has a particle size of from about 5 to 80 microns.

41. The capacitor anode of claim 1, wherein said niobium powder has an aspect ratio from about 3 to about 300.

42. An agglomerated niobium powder, wherein said agglomerated niobium powder has a BET surface area of at least about 5.5 $m^2/g$.

43. The agglomerated powder of claim 42, wherein, when said powder is formed into an elctrolytic capacitor anode, said anode has a capacitance of from 65,000 to about 250,000 CV/g.

44. A capacitor anode comprising the agglomerated niobium powder of claim 42.

45. he capacitor anode of claim 44, wherein said anode has a capacitance of at least 65,000 CV/g.

46. The agglomerated niobium powder of claim 42, wherein said powder has a phosphorus content of less than about 400 ppm.

47. The agglomerated niobium powder of claim 42, wherein said powder is nitrogen doped.

48. The agglomerated niobium powder of claim 42, wherein said powder has nitrogen present in an amount of from about 100 to about 5,000 ppm.

49. The agglomerated niobium powder of claim 42, wherein said powder has a particle size of from about 5 to about 80 microns.

50. The agglomerated niobium powder of claim 42, wherein said powder has a Scott Density of about 35 g/in$^3$ or less.

51. The agglomerated niobium powder of claim 42, wherein said powder has a Scott Density of from about 10 to about 35 g/in$^3$.

52. The agglomerated niobium powder of claim 42, wherein said powder has a flow of at least about 80 mg/s.

53. The agglomerated niobium powder of claim 42, wherein said powder has a flow of from about 80 to about 500 mg/s.

54. A niobium powder having a flow of at least about 80 mg/s.

55. The niobium powder of claim 54, wherein said niobium powder has a flow of from about 80 to about 500 mg/s.

56. The niobium powder of claim 54, wherein said niobium powder is an agglomerated powder.

57. The niobium powder of claim 54, wherein said niobium powder has a particle size of 5 to 80 microns.

58. The niobium powder of claim 54, wherein said niobium powder has a BET surface area of at least 5.5 m$^2$/g.

59. The niobium powder of claim 54, wherein said niobium powder has a phosphorus content of less than about 400 ppm.

60. The niobium powder of claim 54, wherein said niobium powder is nitrogen doped.

61. The niobium powder of claim 54, wherein said niobium powder has nitrogen present in an amount of from about 100 to about 5,000 ppm.

62. The niobium powder of claim 54, wherein said niobium powder comprises flaked powder.

63. The niobium powder of claim 54, wherein said niobium powder has an aspect ratio of from about 3 to about 300.

64. A capacitor anode made from the niobium powder of claim 54.

65. The capacitor anode of claim 64, wherein said anode has a capacitance of at least 65,000 CV/g.

66. The hydrided niobium powder having a BET surface area of at least about 5.5 m$^2$/g.

67. The hydrided niobium powder of claim 66, wherein said powder has a phosphorus level of less than about 400 ppm.

68. The hydrided niobium powder of claim 66, wherein said powder is nitrogen doped.

69. The hydrided niobium powder of claim 66, wherein said powder has nitrogen present in an amount of from about 100 to about 5,000 ppm.

70. The hydrided niobium powder of claim 66, wherein said powder has a flow of at least about 80 mg/s.

71. The hydrided niobium powder of claim 66, wherein said powder has a flow of from about 80 to about 500 mg/s.

72. The hydrided niobium powder of claim 66, wherein said powder has a Scott Density of about 35 g/in$^3$ or less.

73. The hydrided niobium powder of claim 66, wherein said powder has a Scott Density of from about 10 to about 35 g/in$^3$.

74. The hydrided niobium powder of claim 66, wherein said powder comprises an agglomerated powder.

75. The hydrided niobium powder of claim 66, wherein said powder comprises an flaked powder.

76. The hydrided niobium powder of claim 66, wherein said powder has an aspect ratio of from about 3 to about 300.

77. The hydrided niobium powder of claim 66, wherein said powder has a particle size of from about 5 to about 80 microns.

78. A method of making the hydrided niobium powder of claim 66, comprising:

subjecting a niobium ingot to a hydrogen gas to form a hydrided ingot;
  crushing said hydrided ingot to form a crushed niobium powder; and
  milling one or more times to produce milled hydrided niobium powder.

79. The method of claim 78, further comprising acid leaching the milled hydrided niobium powder.

* * * * *